(12) United States Patent
Kurokawa et al.

(10) Patent No.: US 7,443,549 B2
(45) Date of Patent: Oct. 28, 2008

(54) IMAGE READING APPARATUS

(75) Inventors: Naho Kurokawa, Inagi (JP); Tsuyoshi Yamauchi, Yokohama (JP)

(73) Assignee: Canon Kabushiki Kaisha (JP)

( * ) Notice: Subject to any disclaimer, the term of this patent is extended or adjusted under 35 U.S.C. 154(b) by 263 days.

(21) Appl. No.: 11/316,449

(22) Filed: Dec. 22, 2005

(65) Prior Publication Data

US 2006/0139702 A1   Jun. 29, 2006

(30) Foreign Application Priority Data

Dec. 28, 2004   (JP) ............................. 2004-379258

(51) Int. Cl.
  *H04N 1/04*   (2006.01)
  *G06K 1/00*   (2006.01)
  *B41J 2/355*  (2006.01)

(52) U.S. Cl. .................. 358/474; 358/1.6; 358/472; 358/300; 358/301; 358/409; 347/180; 347/182

(58) Field of Classification Search ................ 358/1.6, 358/300–301, 426.01–426.16, 468, 409–424, 358/472–474; 178/21; 347/180–182, 3
See application file for complete search history.

(56) References Cited

U.S. PATENT DOCUMENTS 6,233,064 B1   5/2001   Griffin
6,311,940 B1 *  11/2001  Koshimizu ............... 348/176.1
6,408,161 B1    6/2002  Minowa et al.
6,433,941 B1    8/2002  Onoda
2004/0201778 A1 * 10/2004 Risheq ....................... 348/505

FOREIGN PATENT DOCUMENTS

JP   2000-156756 A   6/2000
JP        1271139 A  10/2000

OTHER PUBLICATIONS

Hewlett Packard, HP Scanjet 4600 series digital flatbed scanners User's Manual, 2003, pp. 2-6.*

* cited by examiner

*Primary Examiner*—King Poon
*Assistant Examiner*—Iriana Cruz
(74) *Attorney, Agent, or Firm*—Rossi, Kimms & McDowell LLP

(57) ABSTRACT

To provide a technology which facilitates positioning of a document to a document table even in a condition of a vertically placed image reading apparatus and by which operability was improved. It is configured in such a manner that, in case that a document cover 6 was opened to an apparatus main body 1 in the vertically placed condition,
(a distance c between a document table glass 2 of an apparatus main body 1 and an end portion 57 of a lowermost portion of a press-contact sheet 8)<(a step (a height from the document table glass 2) d of a step 58a)
is realized.

4 Claims, 22 Drawing Sheets

F I G. 1 2
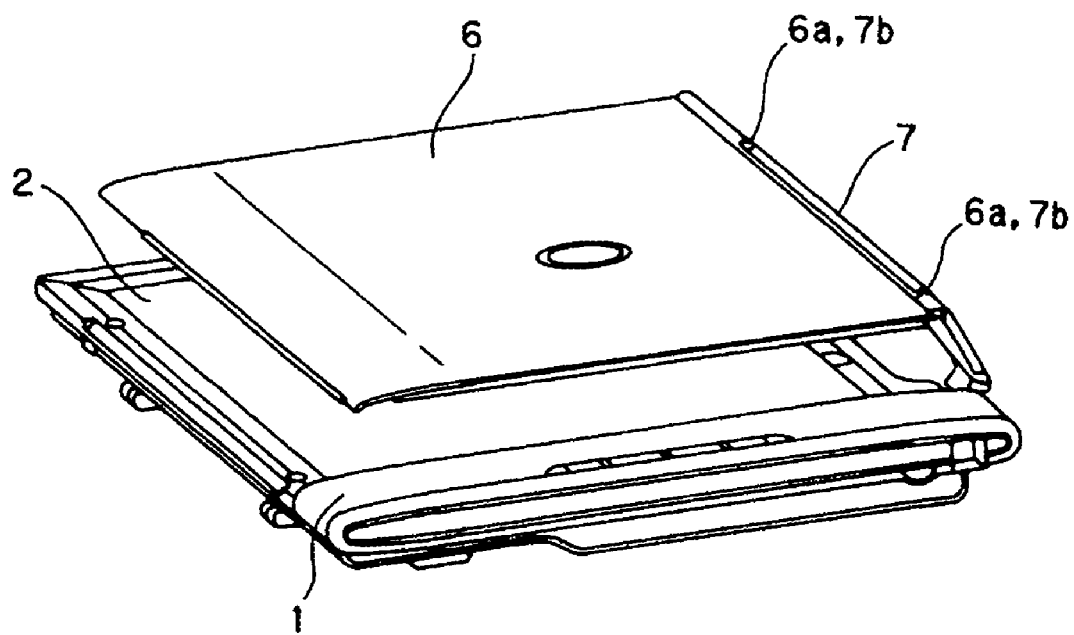

F I G. 16
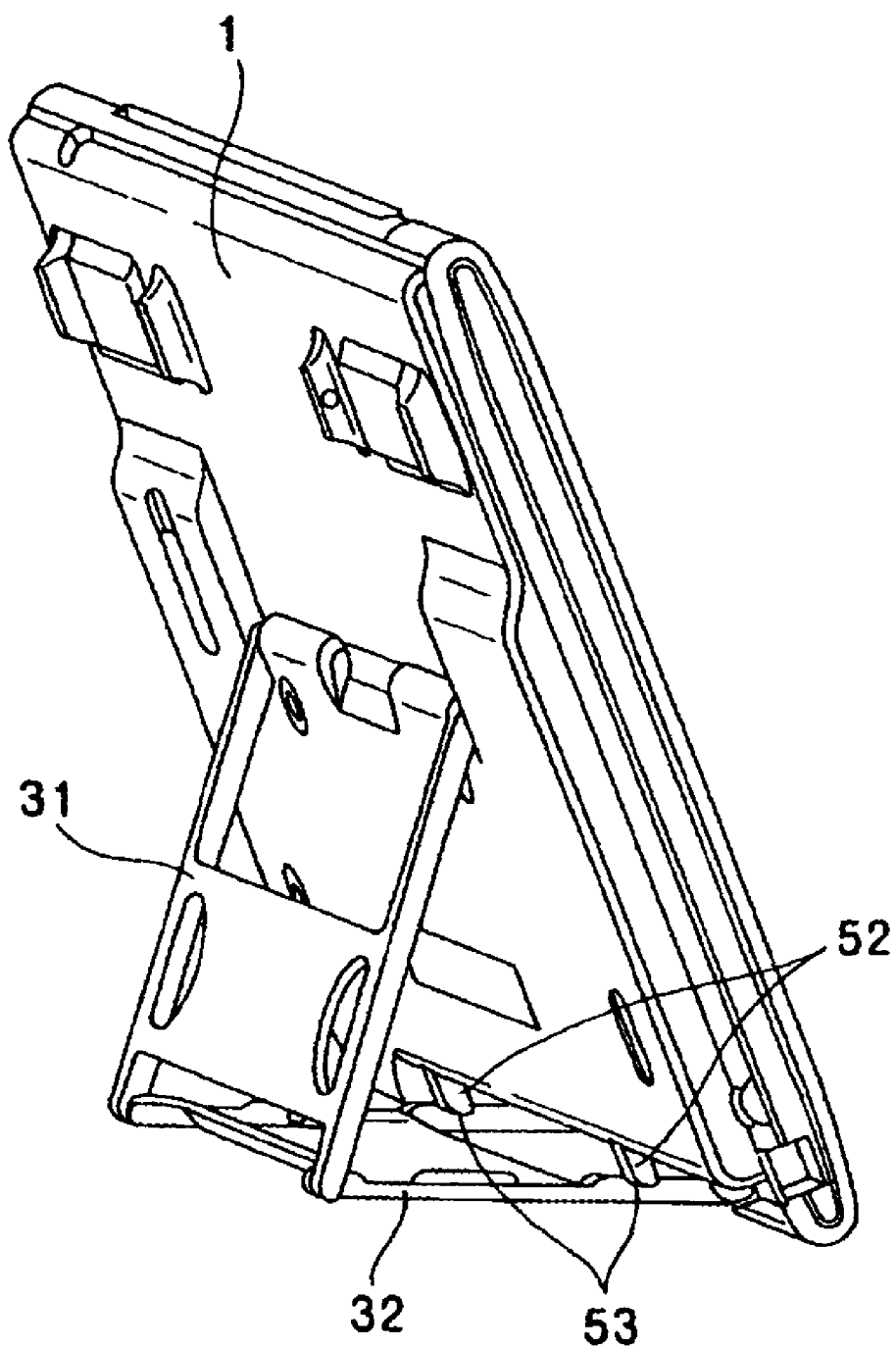

F I G. 17
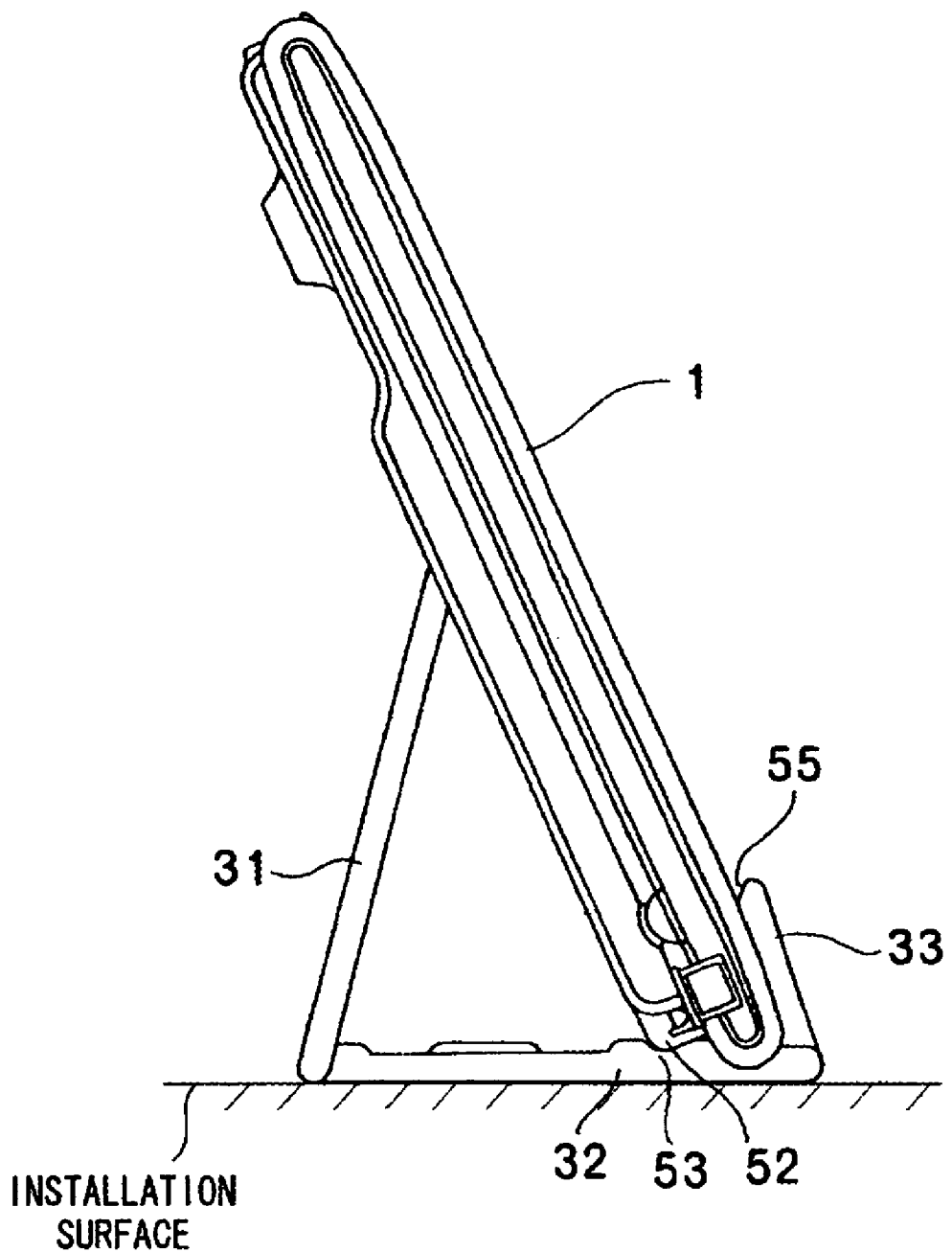

IMAGE READING APPARATUS

BACKGROUND OF THE INVENTION

1. Field of the Invention

This invention relates to an image reading apparatus which reads out image information of a document which was placed on a document table.

2. Related Background Art

Conventionally, in this kind of image reading apparatus, as disclosed in Japanese patent laid-open publication: JP-A-2000-156756 publication (corresponding US registration 6311940), such a thing that an image reading apparatus main body was propped up against a stand to be held in a vertically placed condition has been known.

In the meantime, in the image reading apparatus which was disclosed in JP-A-2000-156756 publication, on the occasion of placing it vertically, a turning center by which a document cover for pressing a document to a document table and an apparatus main body are made to be turnable was nearly perpendicular to an installation surface, i.e., a turning operation (turning direction) of the document cover was nearly parallel to the installation surface. In addition, it was configured in such a manner that, in case that the document cover was opened at the time of placing it vertically, it is opened widely (approximately 90 degrees through 135 degrees) to the apparatus main body.

On this account, in case of setting a document to the document table, there is such a necessity that an operator (user) has a document by hand and carries out positioning of it on the document table, and it has been concerned that positioning of a document becomes difficult.

The invention was made in view of the above-described circumstances, and aims to provide a technology for improving operability, by which positioning of a document to a document table is facilitated even in a virtually placed condition of an image reading apparatus.

SUMMARY OF THE INVENTION

To achieve the above-described object, an image reading apparatus according to the present invention is constituted as follows.

An image reading apparatus which has a document table on which a document is placed and reads out an image of the document and which can be installed in such a manner that a surface of the document table is placed nearly vertically to an installation surface has a document cover which is disposed, in an openable manner, on an image reading apparatus main body, and has a press-contact member which contacts with and presses a document that was placed on the document table, and a positioning section which is disposed with a step to the document table and carries out positioning of a document which is placed on the document table, wherein in case that the document cover is opened to the image reading apparatus main body in such a condition that it was installed so as to be placed nearly vertically, a distance between an end portion on the side of the positioning section in the press-contact member and the document table is smaller than a height of the step of the positioning section to the document table.

BRIEF DESCRIPTION OF THE DRAWINGS

The invention, together with further advantages thereof, may best be understood by reference to the following description taken in conjunction with the accompanying drawings in which:

FIGS. 12 and 13 are views for explaining the condition that only the hinge was opened by 60 degrees in the image reading apparatus which relates to the embodiment of the invention;

FIGS. 15 through 18 are views for explaining a method of installing the support structure, which relates to the embodiment of the invention, in a vertically placed condition, that is vertically oriented;

DETAILED DESCRIPTION OF THE EMBODIMENT

Hereinafter, with reference to the drawings, a best mode for carrying out this invention will be described in detail in an exemplification manner. In this regard, however, dimensions, materials, shapes of constituent components which are described in this embodiment, a relative configuration of them and so on should be changed arbitrarily depending on a configuration and various conditions of an apparatus to which the invention is applied, and they do not mean to limit a scope of the invention to the following embodiments.

(Overall Configuration)

Figure 1:
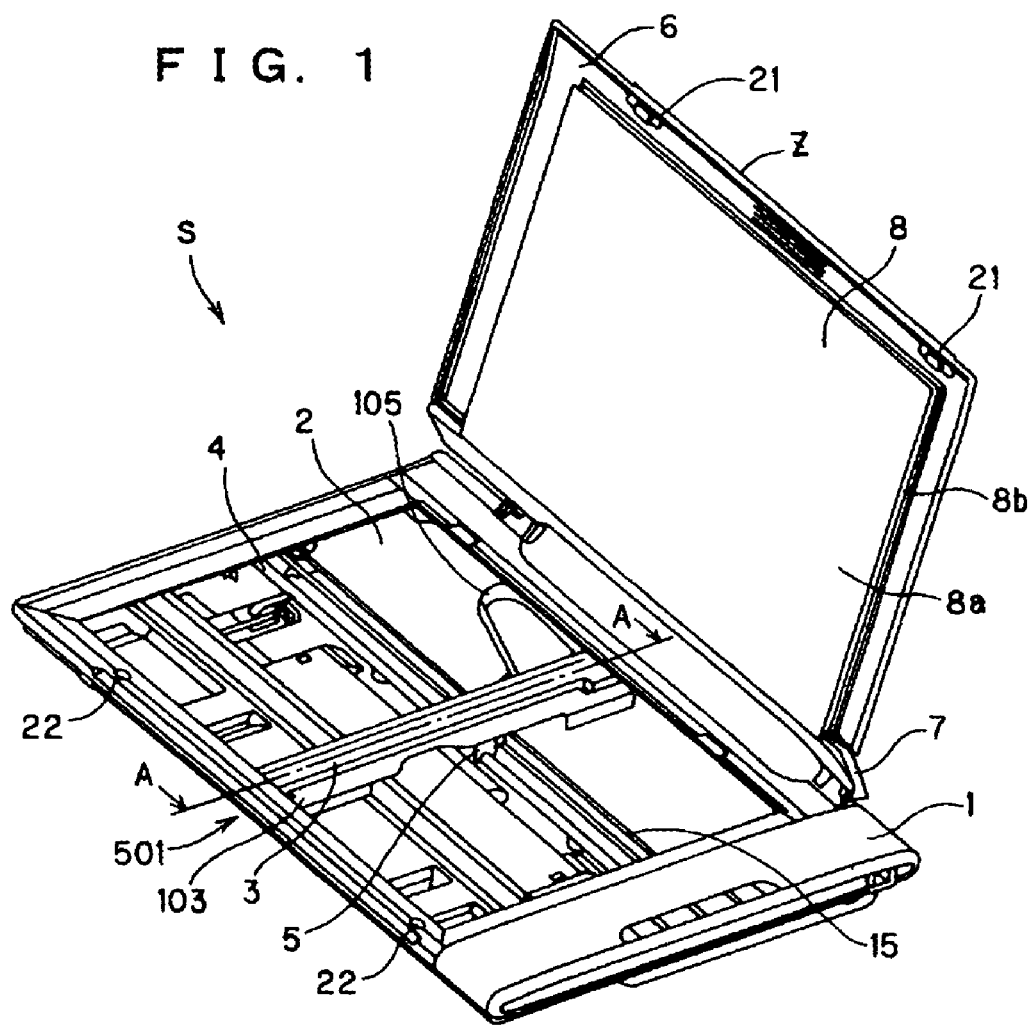
FIG. 1 is a pattern view for explaining a configuration of an image reading apparatus which relates to an embodiment of the invention.

FIG. 1 is a pattern view for explaining a configuration of an image reading apparatus which relates to an embodiment of the invention.

As shown in FIG. 1, an image reading apparatus S reads out an image of a document which is set (placed) on a document table glass (document table) attached to its upper surface, by having a contact image sensor 3 (hereinafter, referred to as CIS) as image reading means scan the image in parallel to the document table glass 2.

Figure 2:
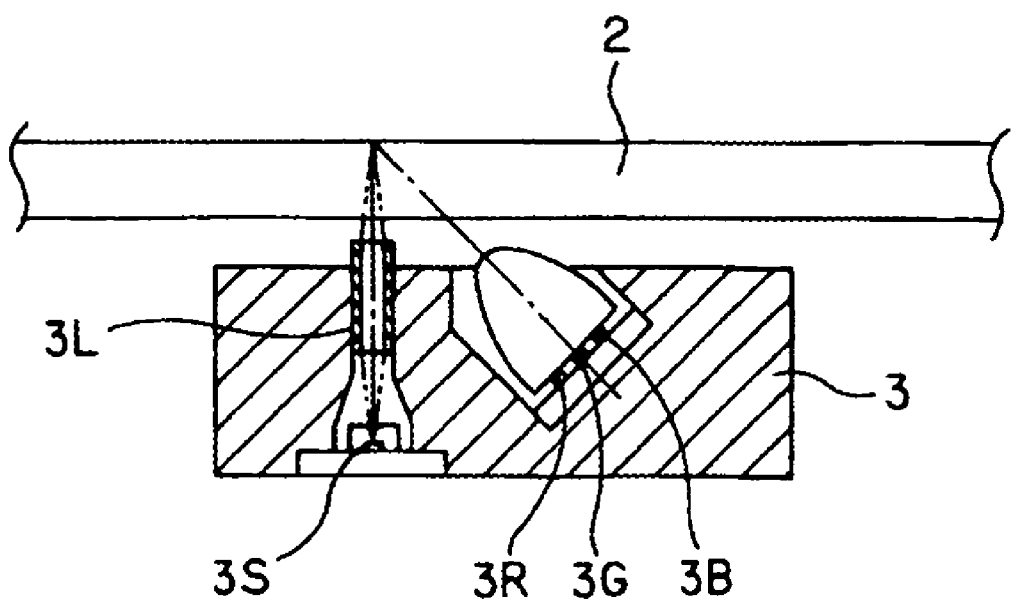
FIG. 2 is a schematic cross-sectional view of a contact image sensor in the embodiment of the invention.
Figure 3:
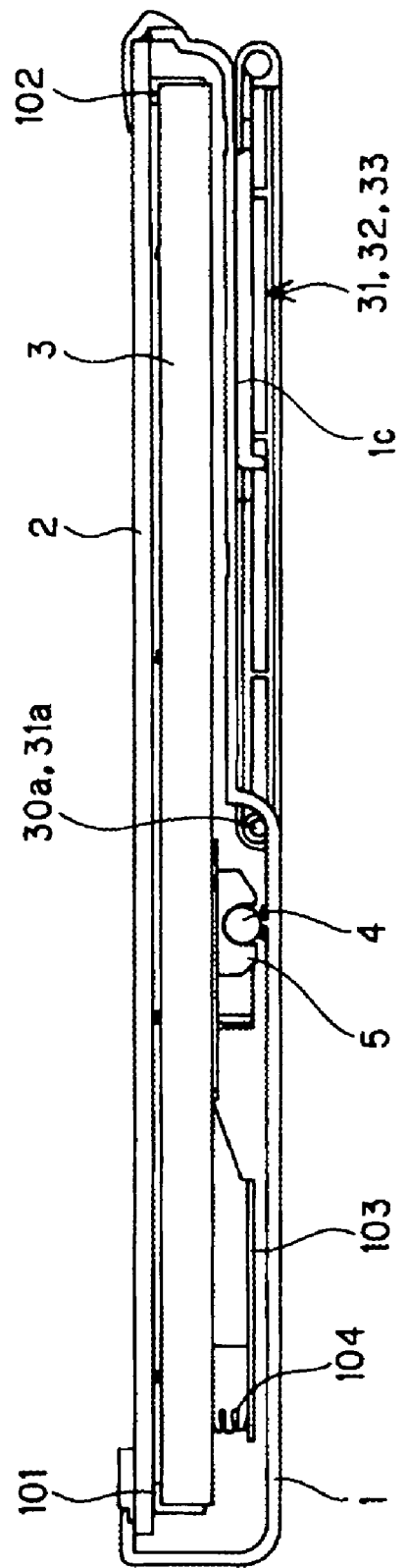
FIG. 3 is a view which shows an A-A cross-section of FIG. 1.
Figure 4:
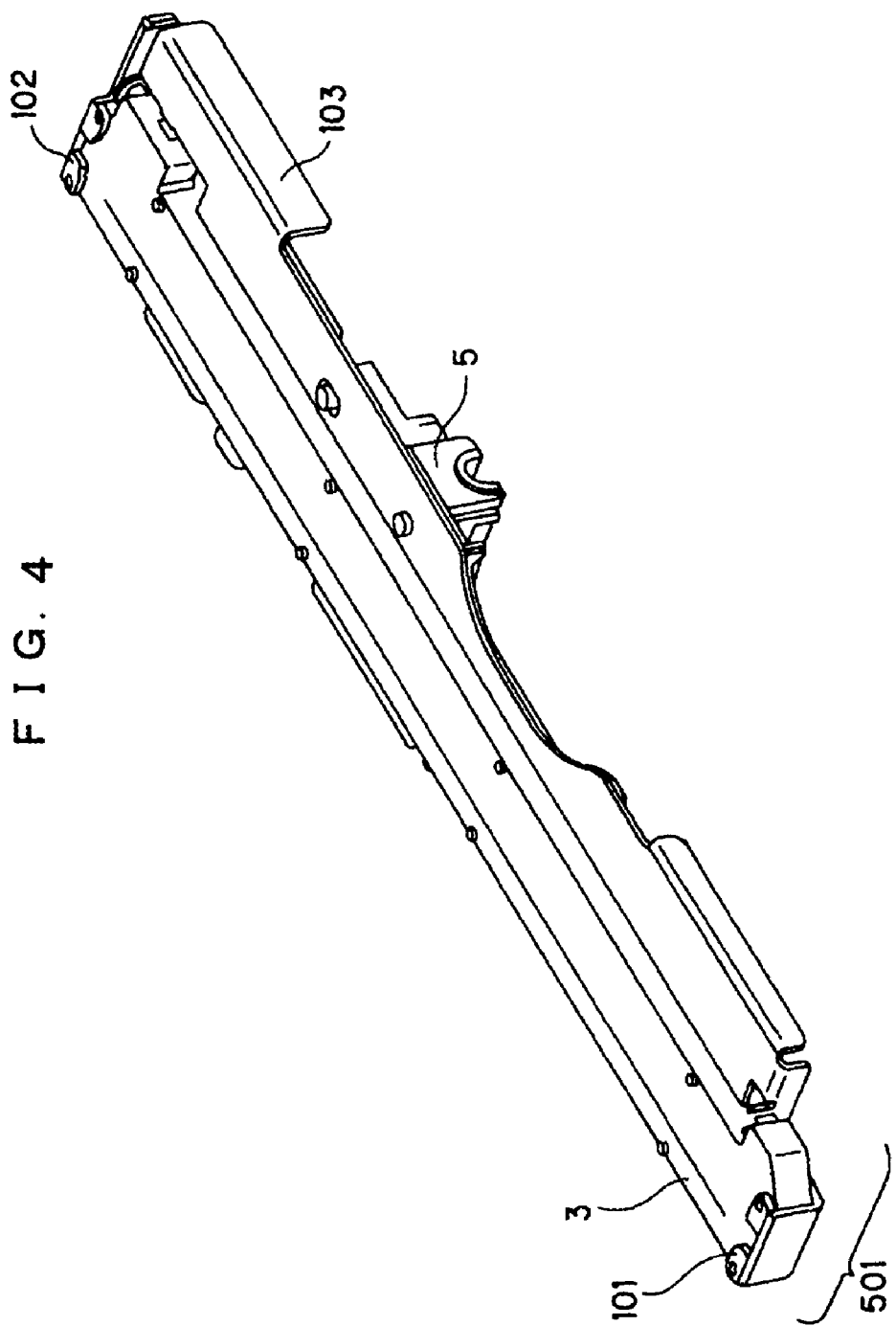
FIG. 4 is a schematic perspective view of a carriage unit in the embodiment of the invention.

FIG. 2 is a schematic cross-sectional view of CIS 3 in this embodiment. FIG. 3 is a view which shows an A-A cross-section in FIG. 1. FIG. 4 is a schematic perspective view of a carriage unit on which the contact image sensor 3 is disposed.

As to CIS 3, as shown in FIG. 2, into its inside, three color LEDs 3R, 3G, 3B which are light sources for document irradiation, a rod lens array 3L for providing an image of reflected light from a document on a light-sensitive element of CIS 3 and an image sensor 3S are incorporated.

The three color light sources are changed over sequentially to be lighted up, and the image sensor 3S reads out reflected light from a document with respect to each color, and thereby, color separation reading is carried out.

The above-described CIS 3 is supported by a sensor holder 103, and as shown in FIG. 3, it is contacted with pressure to the document table glass 2, through spacers 101, 102 which are made of a material with a good sliding performance, by a spring 104 which is positioned on the sensor holder 103.

The sensor holder 103 is fixed and supported on a slider 5 which slides on a guide shaft 4 fixed to an apparatus main body 1, as shown in FIG. 1.

Here, a unit integrated with the slider 5, such as CIS 3, the sensor holder 103, the spring 104, and the slider 5 shown in FIG. 4, is hereinafter called as a carriage 501.

In addition, to the slider 5, a belt 15 for conveying a motive force from a motor which is a scanning drive source is fixed. By forward and backward rotations of the motor, the carriage 501 is configured so as to be able to carry out reciprocating scanning within a range of the document table glass 2.

In addition, one side of a flexible cable 105 for electric input and output of the sensor 3 is connected to the sensor 3, and the other side of the same is connected to a control board (not shown in the figure) of the image reading apparatus main body.

As shown in FIG. 3, as to the apparatus main body 1, a right side of the position that the slider 5 scans in the figure is configured so as to be thin up to a position separated from the sensor by a clearance portion, and at that position, a support structure (31 through 33) is pivotally mounted at 30a.

That is, as to a thickness direction of internal components of the apparatus main body on the side that the support structure is disposed, a total of the sensor and a component which is attached firmly to it is a maximum thickness, and among other necessary components, only those, which are accommodated within its height, are disposed in parallel. A thickness of the apparatus main body 1 at this portion is only (document table glass+close coupling type sensor+component attached firmly to the sensor+clearance gap +frame body).

Detail of the support structure will be described later.

In addition, to the slider 5, the belt 15 for conveying a motive force from the motor which is a scanning drive source is fixed. By forward and backward rotations of the motor, CIS 3 is configured so as to be able to carry out reciprocating scanning within a range of the document table glass 2.

Among constituent elements of the image reading apparatus, there is an electric section which is composed of a control board and a power source, in addition to the above-described elements. These constituent elements are disposed in the apparatus main body 1 which fixes and supports the document table glass.

In addition, on the document table glass 2, a document cover 6 as a pressing member for pressing a document to the document table glass 2 is attached, in openable and closeable manners, to the apparatus main body 1 through a hinge 7 as a hinge member.

In addition, to an inner surface of the document cover 6 as a surface facing to the document table glass 2, a document pressing-contacting sheet 8 as a pressing-contacting member which is composed of a sheet member 8a and an elastic member 8b is pasted. Here, the document cover 6 and the hinge 7 configure a cover member.

Figure 5:
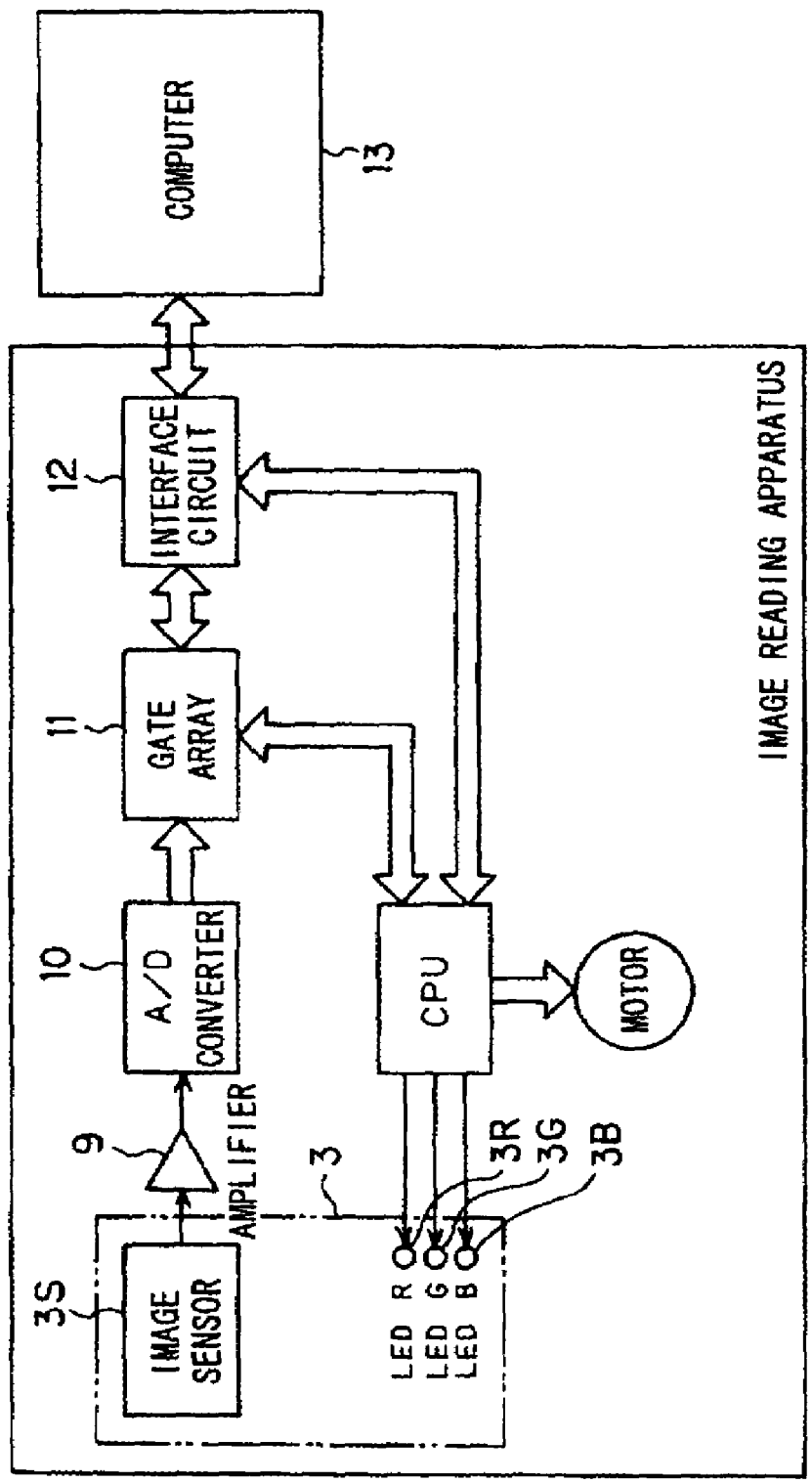
FIG. 5 is a read image data processing block according to the image reading apparatus which relates to the embodiment of the invention.

FIG. 5 is a read image data processing block diagram according to the image reading apparatus.

An image output signal, which was read out by the image sensor 3 in synchronization with LEDs which turn on and off sequentially, is sent to an amplifier 9 and amplified there, and after that, converted into a digital image signal by an A/D converter 10. The A/D converter 10 divides a dynamic range (a read output difference between a stark white portion and an intense black portion on a document) of the image sensor 3S into portions of its bit number, and allocates a tone number depending on brightness of an image on a document. For example, in case that an A/D converter with 8 bit resolution is used, it is possible to discriminate the brightness of an image ranging from white to black by 256 tone levels, and in case of a 10 bit A/D converter, it is possible to discriminate it by 1024 tone levels. Therefore, in case of color reading due to RGB three color light sources in the image reading apparatus using an 8 bit A/D converter, it is possible to discriminate 24 bit=approximately 16.70 million colors, and in case of 10 bit, it is possible to discriminate 30 bit=approximately 1074 million colors.

There are several kinds of output forms of image signals of an image reading apparatus, and depending on a usage of an image which was read out, it is possible to select an output form which is suitable for it. In case that a text is read out and its content is applied to OCR (optical character reader), and in case of reading out monochrome line drawings, a monochrome binary image is suitable. In this case, used is image data which was converted from an image signal which was obtained by lighting, for example, only G, among the above-described RGB light sources, into binary codes at a certain threshold value by an image processing circuit incorporated into a gate array 11.

In case of reading out an image for the purpose of reading out an image such as a photograph and outputting it to a monochrome printer, used is image data which was converted into binary codes by using halftone processing such as a dither method and an error diffusion method, through the use of an image signal due to the G light source likewise.

In case of carrying out processing of a color image, a multi-valued (24 bit etc.) image data is suitable.

The above-described image signal, which passed through the image processing circuit, is outputted to a device such as a personal computer 13 through an interface circuit 12.

(Document Cover/Hinge Configuration)

Next, an opening/closing configuration of the document cover 6 to the apparatus main body 1 will be described.

Figure 6:
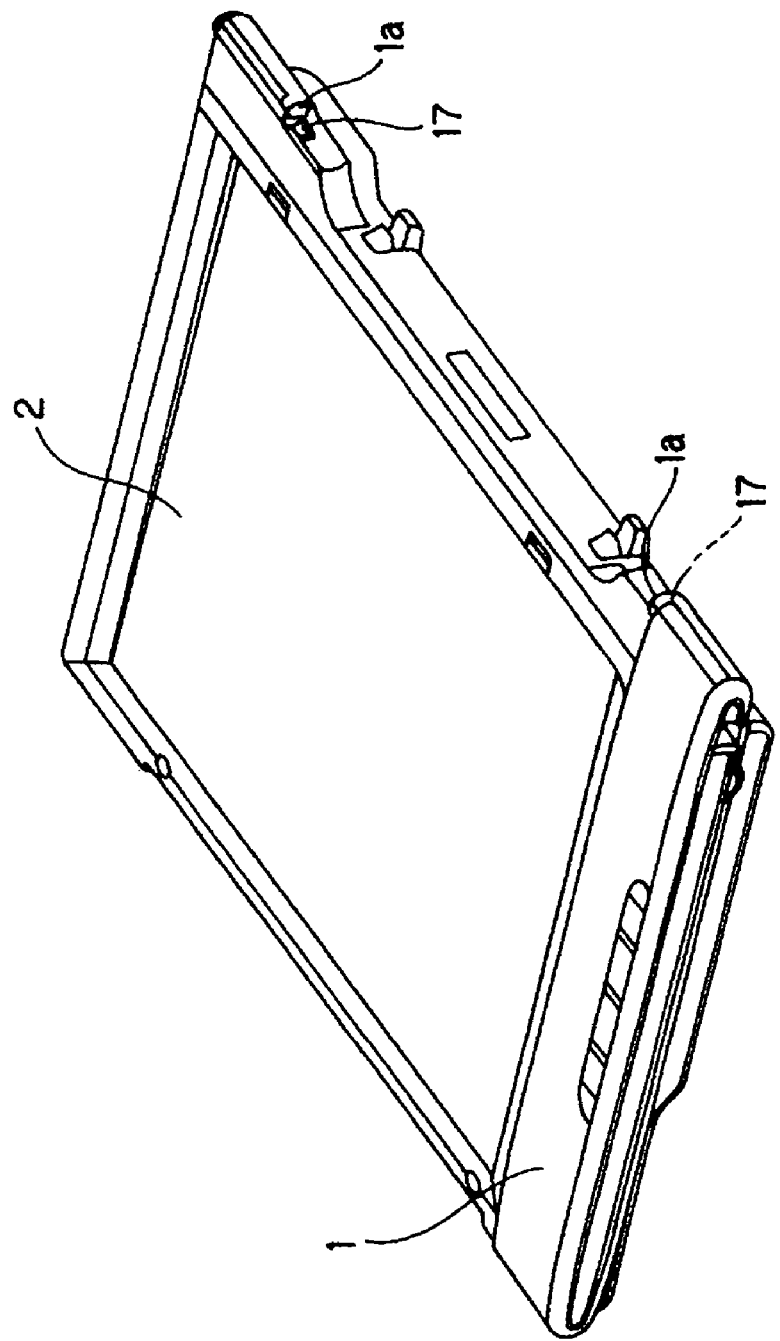
FIGS. 6 through 8 are views for explaining a configuration of a hinge which couples a document cover in openable and closeable manners, in the image reading apparatus which relates to the embodiment of the invention.
Figure 7:
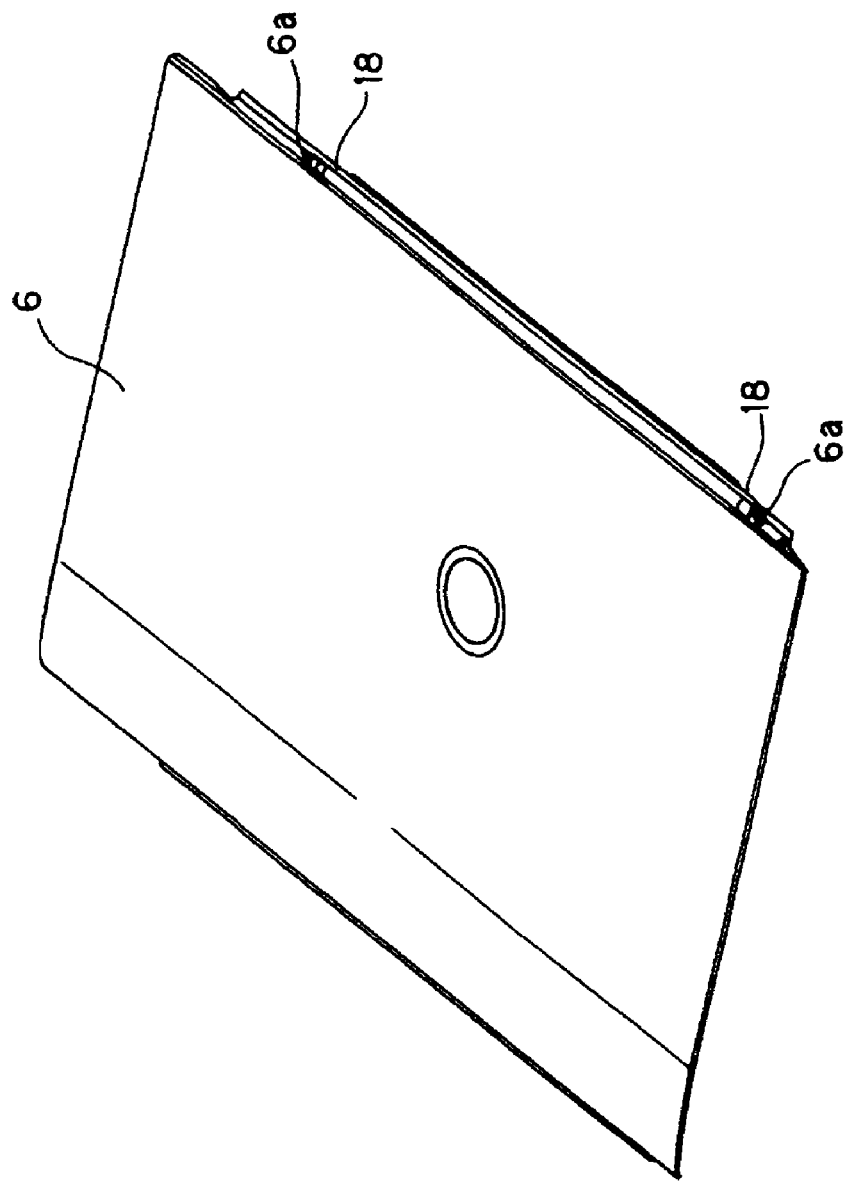
Figure 8:
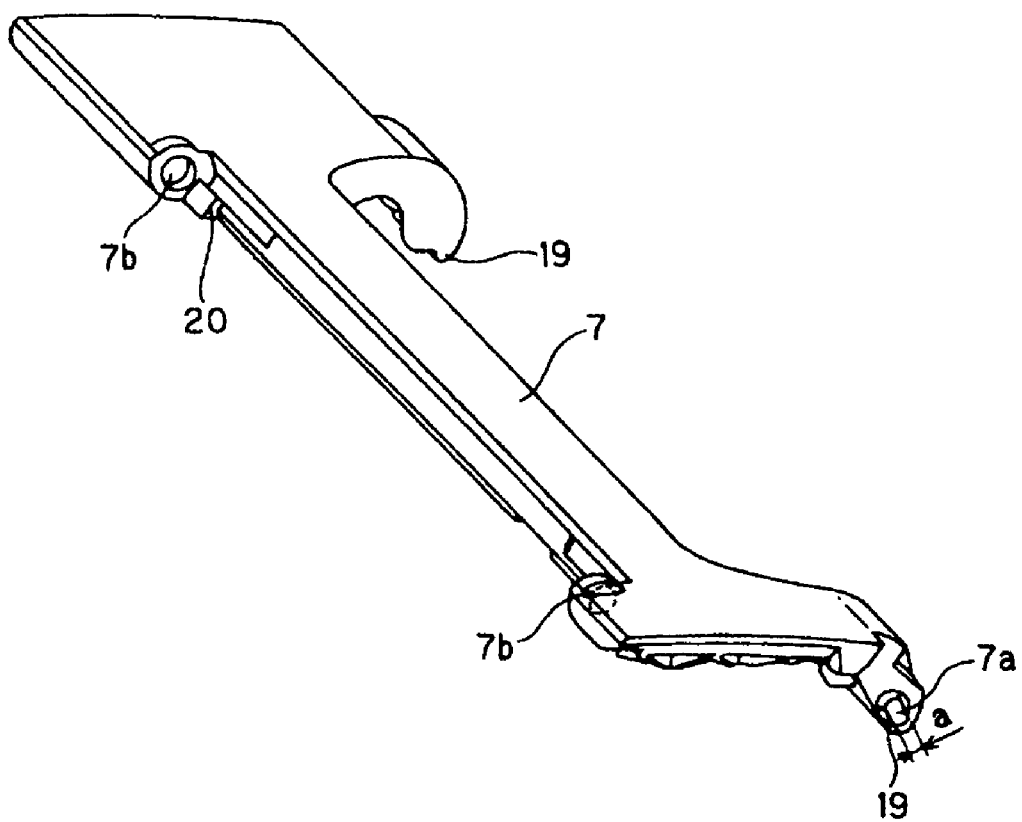

FIGS. 6 through 8 are views for explaining a configuration of a hinge which couples the apparatus main body 1 and the document cover 6 in an openable and closeable manner.

That is, FIG. 6 is a view which shows the apparatus main body 1 (the condition that the document cover 6 was removed from the image reading apparatus) in this embodiment, and FIG. 7 is a view which shows the document cover 6, and FIG. 8 is a view which shows the hinge 7.

Figure 9:
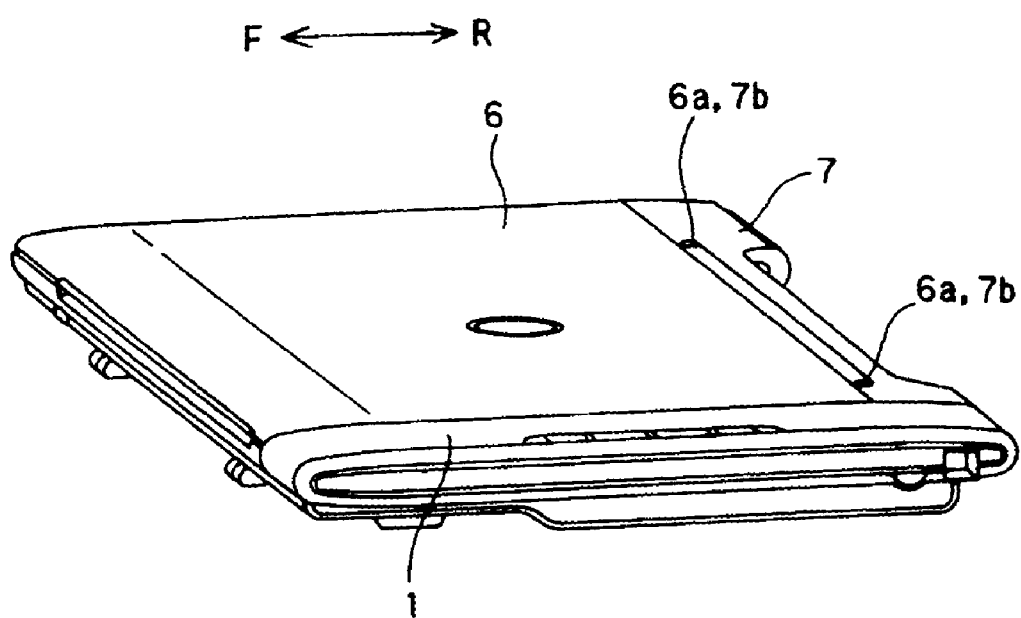
FIG. 9 is a view for explaining the condition that the document cover is closed in the image reading apparatus which relates to the embodiment of the invention.
Figure 10:
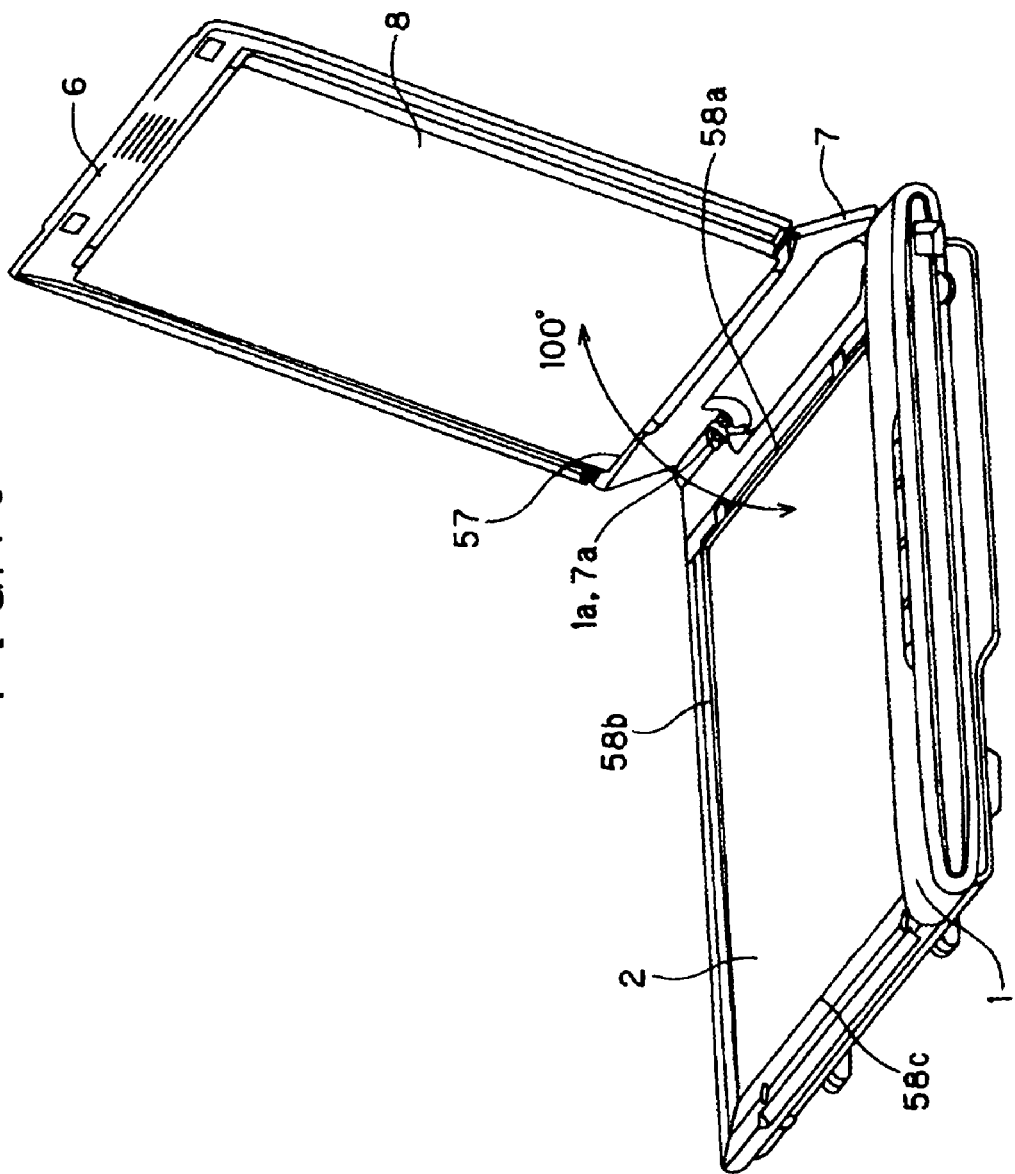
FIG. 10 is a view for explaining the condition that the document cover is opened by 100 degrees in the image reading apparatus which relates to the embodiment of the invention.

In addition, FIG. 9 is a view for explaining the condition that the document cover 6 was closed, and FIG. 10 is a view for explaining the condition that the document cover 6 was opened by nearly 100°.

Figure 11:
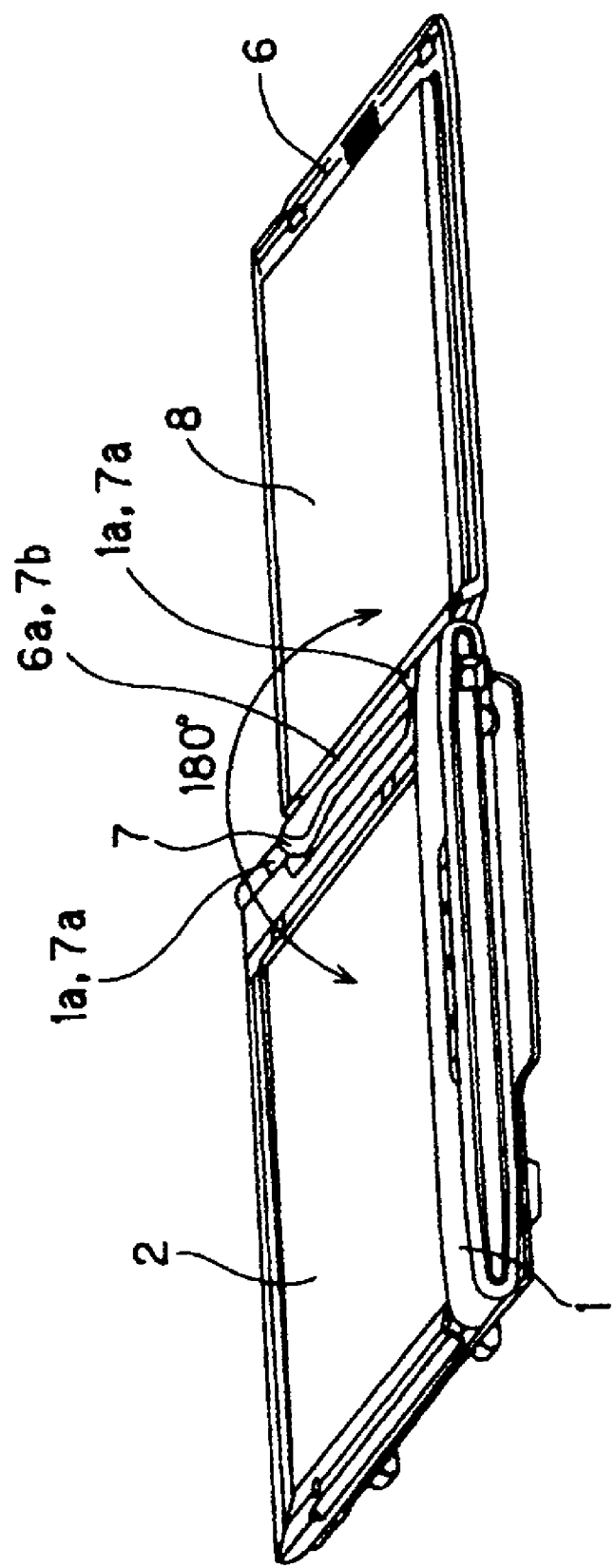
FIG. 11 is a view for explaining the condition that the document cover is opened by 180 degrees in the image reading apparatus which relates to the embodiment of the invention.
Figure 13:
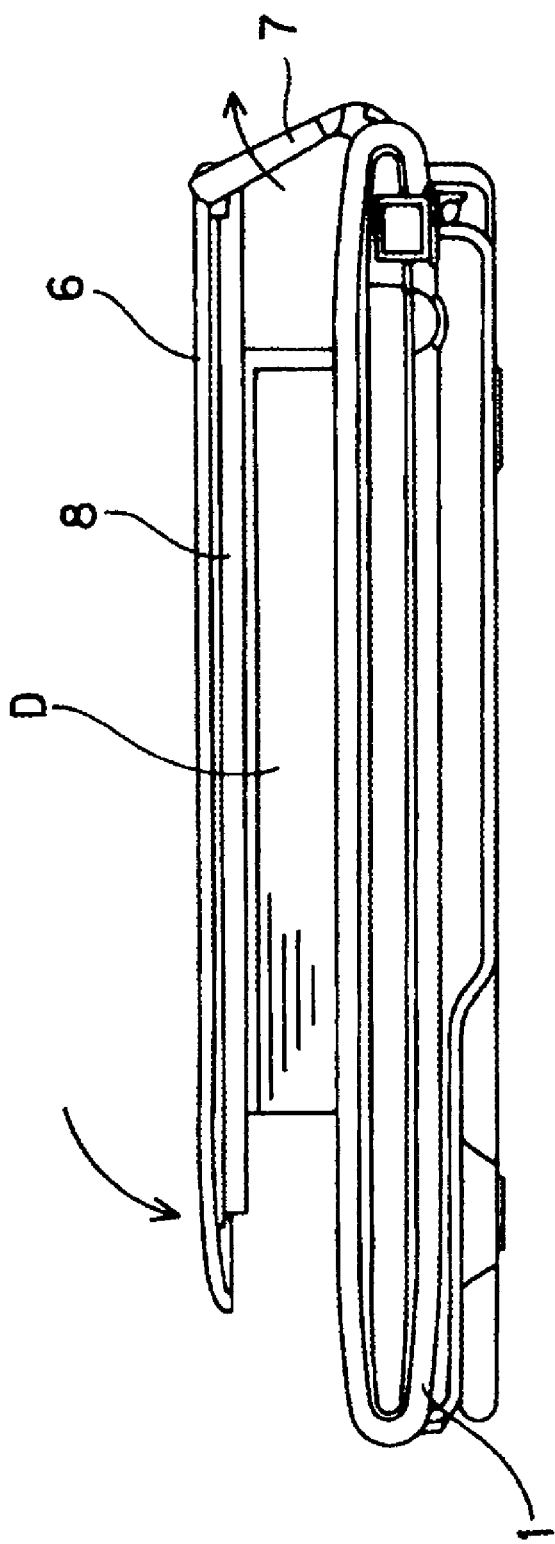

FIG. 11 is a view for explaining the condition that the document cover 6 is opened by nearly 180°, and FIGS. 12 and 13 are view of the condition that only the hinge 7 is opened by nearly 60° (the condition that the document cover 6 was moved nearly in parallel to the document table glass 2).

As shown in FIGS. 6 through 13, on the image reading apparatus, the document cover 6 for pressing a document P to the document table glass 2 and the hinge 7 for connecting the apparatus main body 1 and the document cover 6 are disposed, and thereby, the document cover 6 becomes openable and closeable to the apparatus main body 1.

Here, between the apparatus main body 1 and the hinge 7, a fitting portion of a concave portion 1*a* which is disposed at a rear end portion of the apparatus main body 1 and a convex portion 7*a* which is disposed at a rear end portion of the hinge 7 becomes a supporting point (pivot, pivoting axis), and the hinge 7 becomes openable and closeable to the apparatus main body 1.

Meanwhile, the concave portion 1*a* configures a bearing portion of a open position adjustment mechanism which relates to the invention, and the convex portion 7*a* configures a pivoting axis of the open position adjustment mechanism which relates to the invention.

In addition, between the hinge 7 and the document cover 6, a fitting portion of a concave portion (hereinafter, referred to as axis supporting portion) 7*b* which is disposed at a front end portion of the hinge 7 and a convex portion (hereinafter, referred to as axis supporting portion) 6*a* which is disposed at a rear end portion of the document cover 6 becomes a supporting point (pivot, pivoting axis), and they become pivotable relatively.

In this manner, between the apparatus main body 1, the hinge 7 and the document cover 6, two (two points) fitting portions are used as supporting points, and they are connected pivotally, and by this means, the document cover 6 becomes openable and closeable to the apparatus main body 1.

Meanwhile, in this embodiment, a side, which configures a pivot with the hinge 7 in the apparatus main body 1, is assumed to be a rear side, and a side, which is in a nearly orthogonal direction to the pivoting axis in the apparatus main body 1 and is separated from the pivoting axis, is assumed to be a front side (an arrow F side shown in FIG. 9).

In the hinge 7 and the document cover 6, front and rear are defined under such a condition that they are closed to the apparatus main body 1.

(Support Structure)

Figure 14:
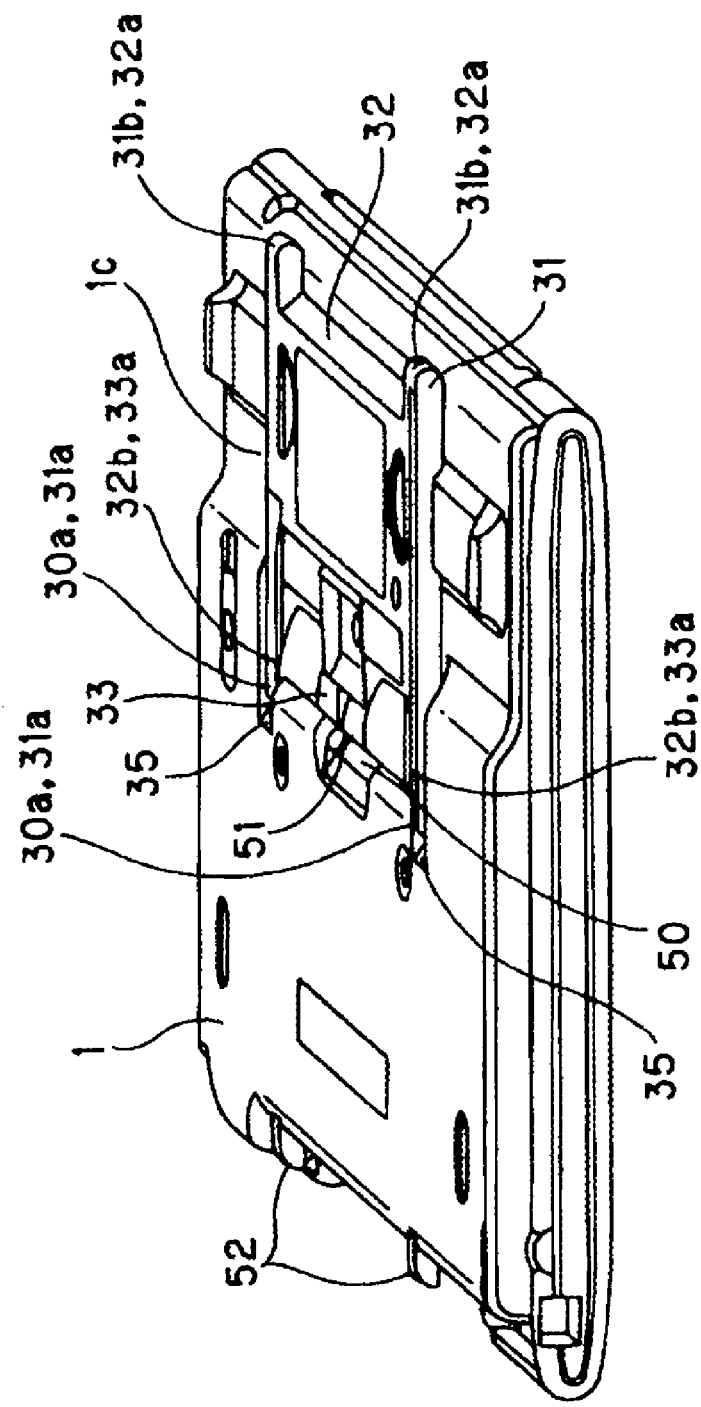
FIG. 14 is a view for explaining the condition that the support structure, which relates to the embodiment of the invention, is stored in a back surface of the apparatus main body.

Next, a support structure for holding an image reading apparatus in a vertically placed condition will be described. FIG. 14 is a view for explaining the condition that the support structure is stored in a rear surface of the apparatus main body 1, and FIGS. 15 through 18 are views for explaining an installation method of the support structure for installing the image reading apparatus in a vertically placed condition (at a vertically placed position).

Figure 19:
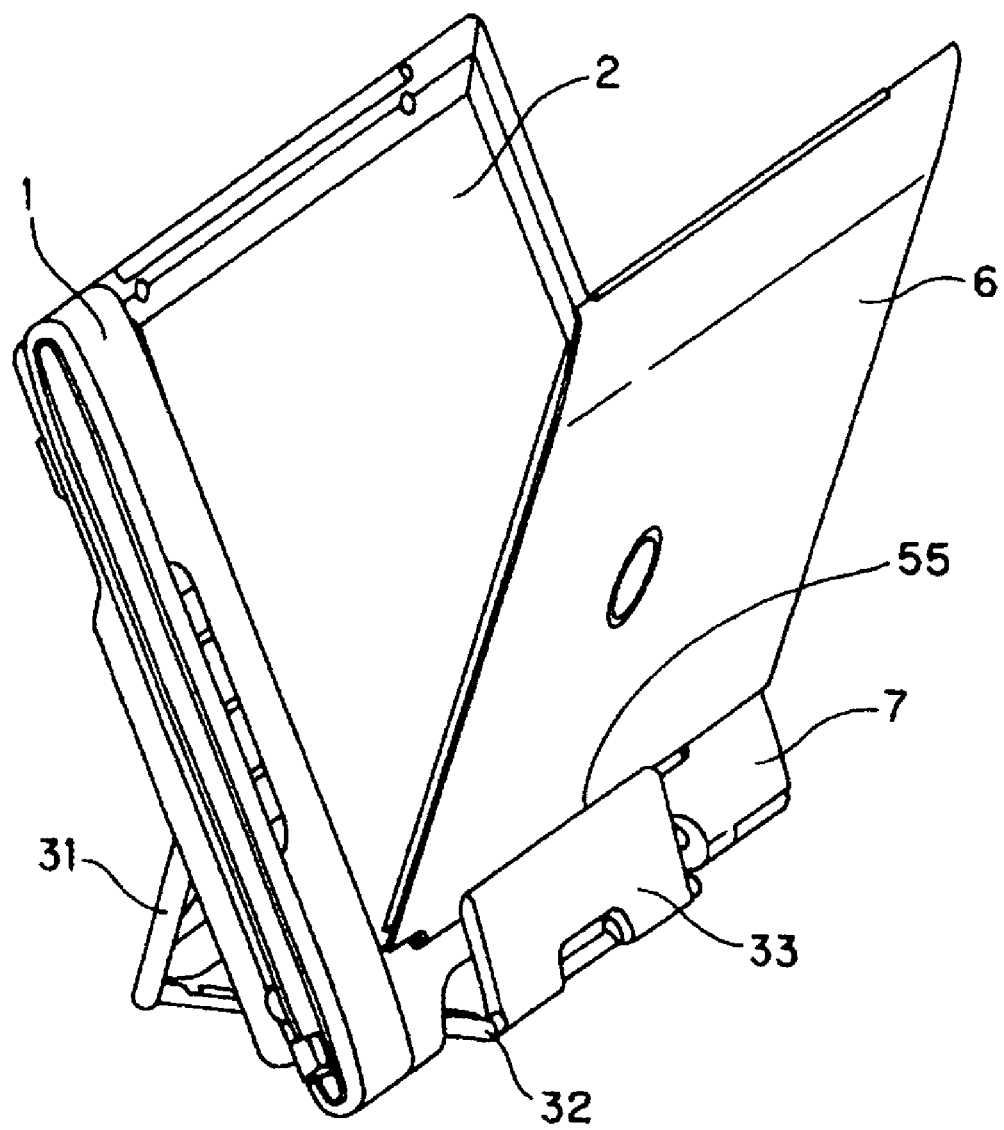
FIG. 19 is a view for explaining the condition that the document cover is opened, after the support structure, which relates to the embodiment of the invention, was installed in a vertically placed condition.

FIG. 19 is a view for explaining the condition that the document cover is opened after the support structure for installing the image reading apparatus in a vertically placed condition was placed.

As shown in FIG. 14, the support structure, which is stored in a storage portion 1*c* disposed in a bottom portion of the apparatus main body 1 in a horizontally placed condition, is configured by three components of a support structure L 31 as a first pivot member, a support structure M 32 as a second pivot member, and a support structure S 33 as a third pivot member.

Then, these three components are disposed in the form of inline pivotally each other, and folded to be stored in the storage portion 1*c*. Meanwhile, in case of using it in a horizontally placed condition (carrying out image reacting), the support structure is in such a condition that it is stored in the apparatus main body 1.

Next, with reference to FIGS. 14 through 18, a method of installing the image reading apparatus in a vertically placed condition by use of the support structure will be described.

Figure 18:
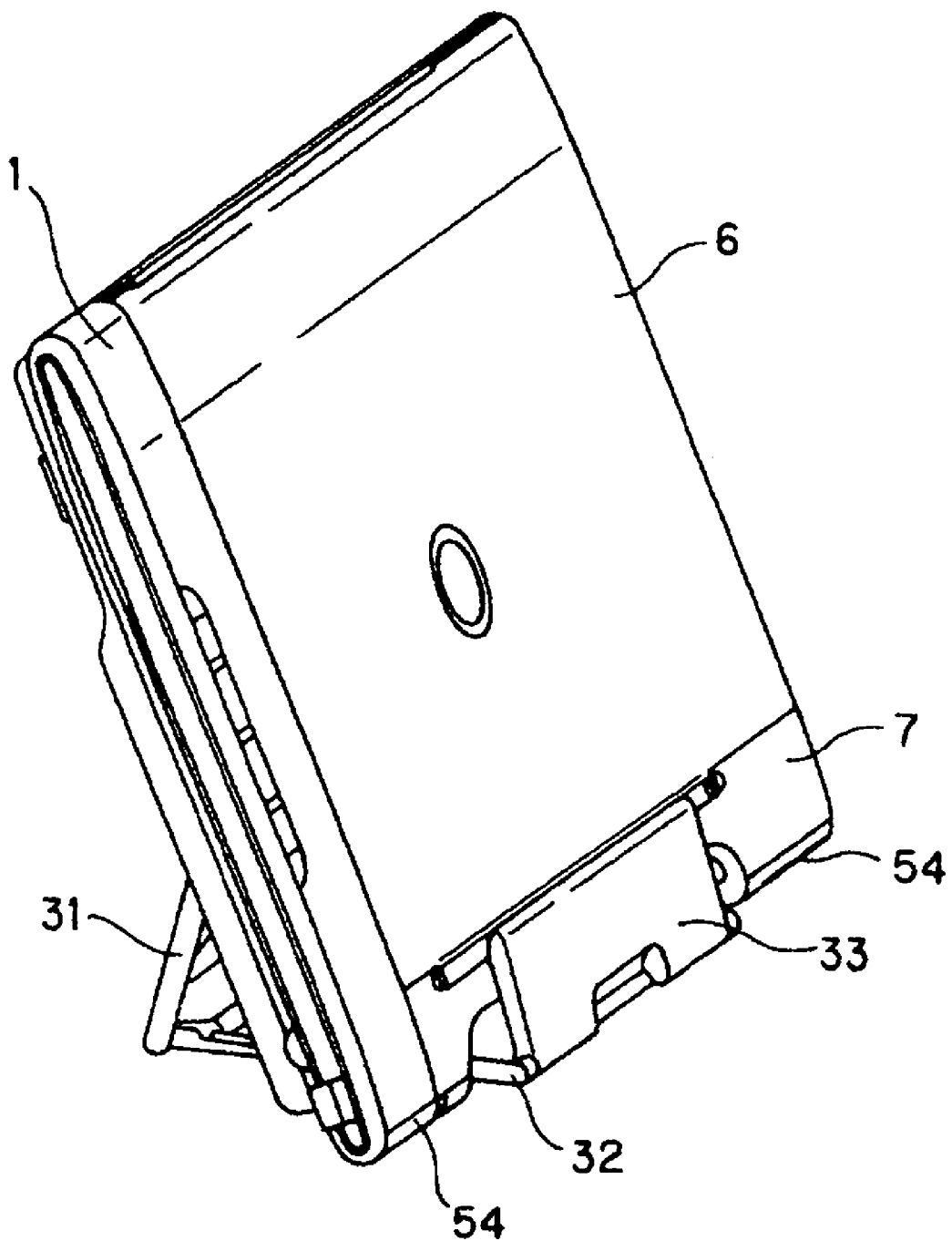

In order to change from the stored condition shown in FIG. 14 to a vertically placed condition shown in FIG. 18, firstly, an operator puts a finger into a concave portion 50 of the apparatus main body 1, and picks up a knob portion 51 of the support structure S 33.

Figure 15:
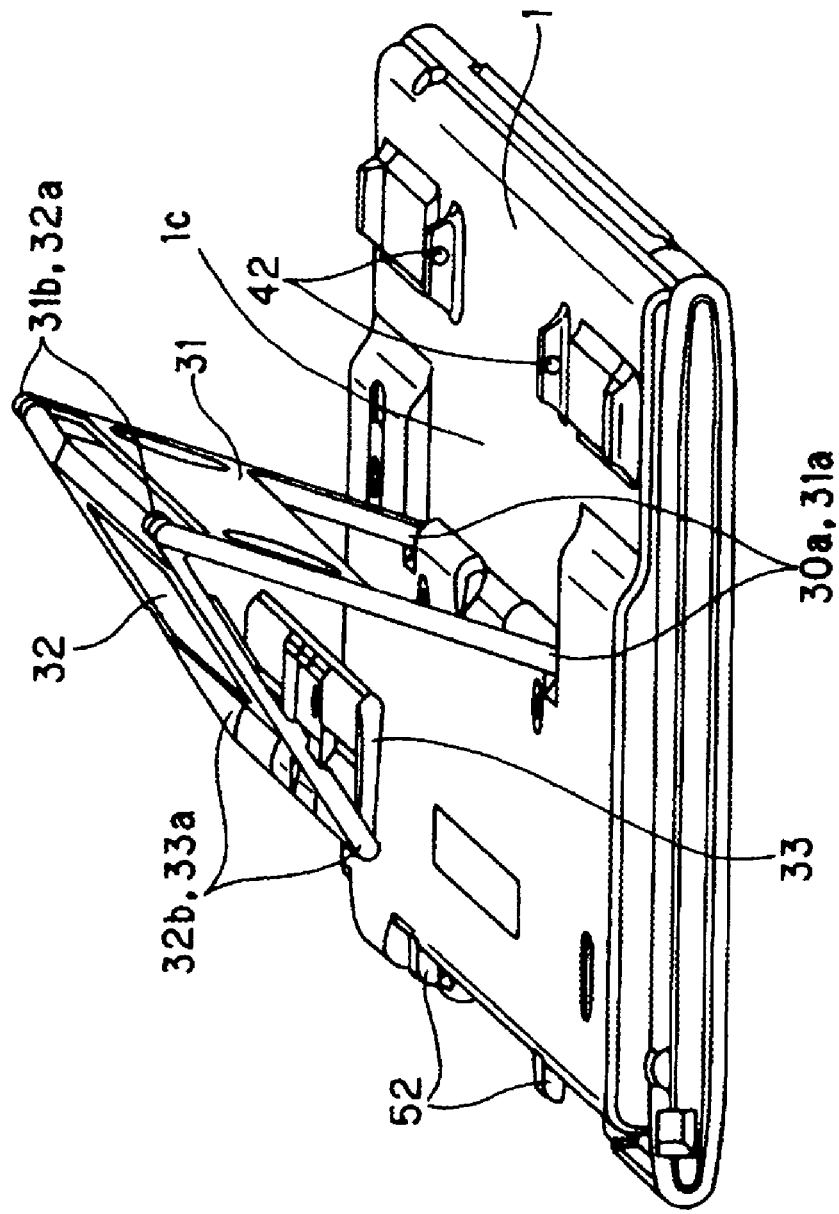

By this operation, the above-described elastic member 40, which was incorporated in the support structure M 32, is released from the concave portion 42 which is disposed in the apparatus main body 1 (see, FIG. 15).

The support structure L 31, the support structure M 32, and the support structure S 33 turn around the above-described three turning axes as a center within a range of a pivot angle.

When each of them pivots by nearly the maximum pivot angle, the support structure S 33, which is located at the farthest end portion among the three support structures attached to the apparatus main body 1, reaches the position that it overrides the hinge 7.

In sum, the support structure M 32 falls in such a condition that it pivots toward a front surface side (the document cover 6 side, the hinge 7 side) from a rear surface side of the apparatus main body 1, and the support structure S 33 is nearly located on a front surface side of the apparatus main body 1.

At this position, when a protrusion 52 of the apparatus main body 1 is engaged with (fitted with) a concave portion 53 of the support structure M 53, it is possible to build up the support structure on the apparatus main body 1 as shown in FIGS. 16 through 18.

In this condition, an outside surface of the support structure M 32 is placed on a nearly horizontal installation surface such as a desk (the support structure M 32 faces to the installation surface), and thereby, it is possible to install the image reading apparatus in a vertically placed condition as shown in FIG. 18.

That is, the apparatus main body 1 is to be placed on the installation surface through the support structure L 31 and the support structure M 32.

Here, the support structure L 31 and the support structure M 32 function as a supporting portion which supports the apparatus main body 1, and the protrusion 52 of the apparatus main body 1 and the concave portion 53 of the support structure M 32 function as a holding portion which holds the apparatus main body 1 in a vertically placed condition.

In addition, in case that the support structure is installed in a vertically placed condition, the support structure is locked at the position in which a receiving portion 55 (55*a*) of the support structure S 33 as a restriction portion presses a surface of the hinge 7 (upper surface in a horizontally placed condition).

In addition, by engagement of the protrusion 52 and the concave portion 53, the support structure and the apparatus main body 1 are positioned, and therefore, the hinge 7 is to be fixed in such a condition that it is attached firmly to the apparatus main body 1.

Here, the support structure S 33 and the support structure M 32 function as a holding portion.

Meanwhile, in this embodiment, the support structure S 33 functions as a holding portion, but even in case that the support structure S 33 is not disposed, it is possible to function the above-described protrusion 52 of the apparatus main body 1 and the concave portion 53 of the support structure M 32 as a holding portion. On one hand, the document cover 6 is configured pivotally to the hinge 7 around axis supporting portions 6a, 7b as a supporting point.

Here, in case that the document cover 6 turns around the axis supporting portions 6a, 7b as a supporting point, the document cover 6 is to be restricted by the hinge 7 at the position that it is opened by nearly 40° to the hinge 7, as described above. In this embodiment, as shown in FIG. 19, a receiving portion 55 (55b), which receives (supports) the document cover 6 at the position that the document cover 6 is opened by nearly 40° to the hinge 7, is disposed on the support structure S 33.

By this means, it is possible to determine an opening angle of the document cover 6 in a vertically placed condition, and it is possible to prevent a stress from being concentrated on the axis supporting portions 6a, 7b due to own weight of the document cover 6.

Meanwhile, in case that a stress to be concentrated on the axis supporting portions 6a, 7b does not become a problem, it is also all right even if an opening angle of the document cover 6 in a vertically placed condition is determined by a restriction portion between the document cover 6 and the hinge 7, without disposing the receiving portion 55 (55b) which receives the document cover 6, on the support structure S 33.

Next, the press-contact sheet 8, which is provided on the document cover 6 and presses a document set on the document table glass 2, will be described.

The press-contact sheet 8 in this embodiment is configured so as to guide a document to a predetermined position on the document table glass 2, in a vertically placed condition of the image reading apparatus as shown in FIG. 19.

Figure 22:
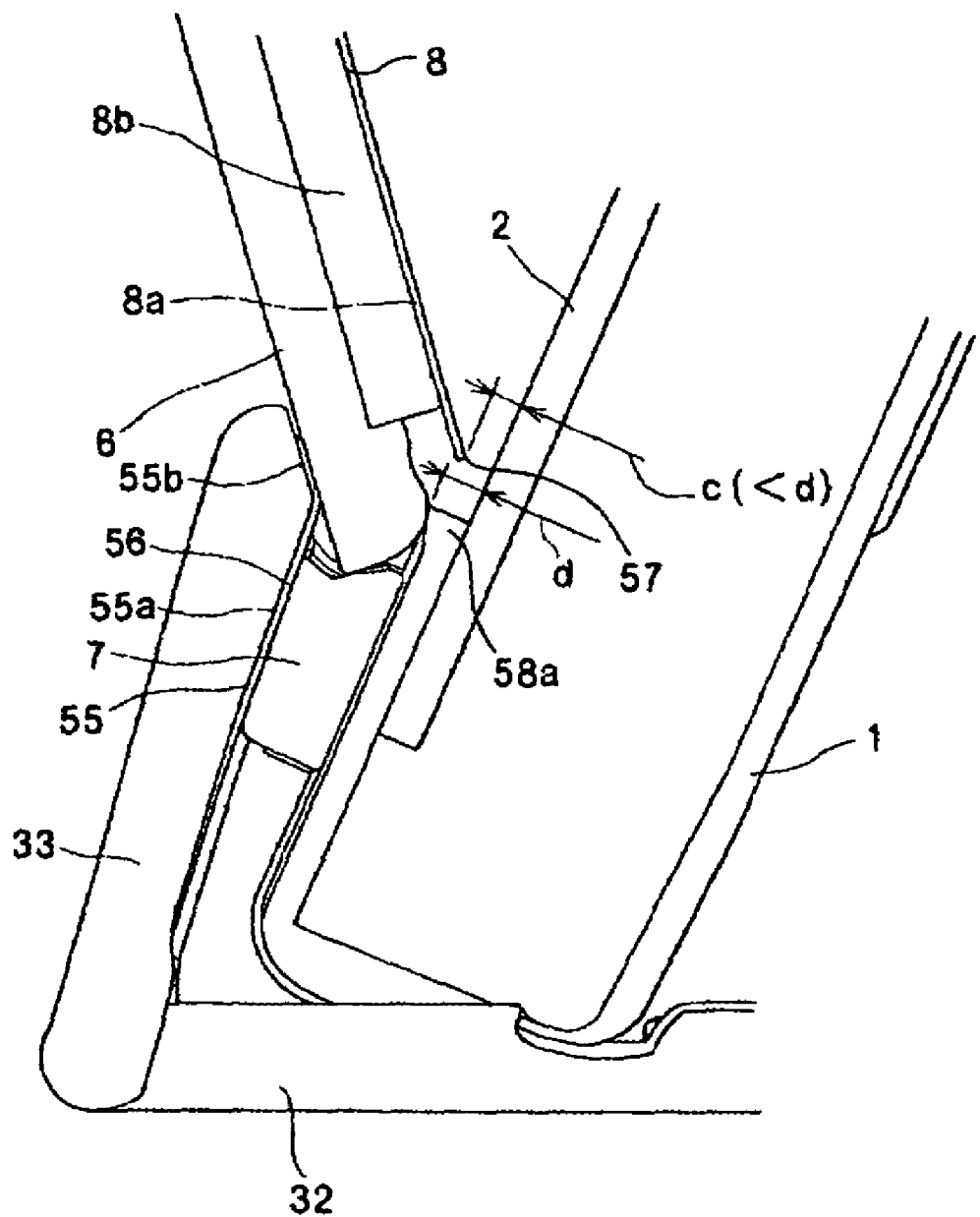
FIG. 22 is an enlarged view of a substantial part of the image reading apparatus which is shown in FIG. 19.

As shown in FIG. 22, in case that the document cover 6 is opened in a vertically placed condition of the image reading apparatus, the document cover 6 turns around a fitting portion of the concave portion 7b at a front end of the hinge 7 and the convex portion 6a at a rear end portion of the document cover 6 as a supporting point.

By the protrusion 18 of the document cover 6, the protruded portion 20 of the hinge 7 and the receiving portion 55 (high friction elastic member 56) of the support structure S 33, its pivot angle is restricted, and its posture is maintained at the position that it is opened by nearly 40° to the hinge 7.

At this time, an end portion 57 (an end portion on the hinge 7 side of the press-contact sheet 8), which becomes the lowermost portion of the press-contact sheet 8 in a vertically placed condition of the image reading apparatus, is disposed so as to be located in the vicinity of a step 58a (see, FIG. 10).

Here, the step 58a is a step which is disposed on a rear end side (hinge 7 side) in forward and backward directions (transverse direction) among steps 58 (58a, 58b, 58c, 58d) which are disposed between the apparatus main body 1 and the document table glass 2.

The step 58a is one to which a document is struck in case that the document is placed on the document table glass 2 and which functions as a positioning portion (struck portion) of a document on the document table glass 2.

FIG. 22 is a schematic cross-sectional view which represents the vicinity of this step 58a in detail. FIG. 22 is an enlarged view of a substantial part of the image reading apparatus shown in FIG. 19.

As shown in FIG. 22, under such a condition that the document cover 6 is opened by nearly 40° to the hinge 7 in a vertically placed condition of the image reading apparatus, a distance c between the document table glass 2 and the lowermost portion 57 of the sheet member 8a is configured so as to be smaller than a step d of the step 58a and to realize c<d.

By the above-described configuration, in case of setting a document from an upper side in a vertically placed condition of the image reading apparatus, an edge (front edge) of the document is to be necessarily reached to the step 58a along (through the guidance of) the press-contact sheet 8 or the document table glass 2.

That is, even if a document is made to fall down freely from a certain level of a height, an edge of the document reaches the step 58a through the guidance of the press-contact sheet 8 or the document table glass 2.

On this account, eliminated is the necessity that an operator holds a document until an edge of the document contacts the step 58a of the apparatus main body 1 on the occasion of setting the document.

Therefore, it is possible to carry out document setting easily and accurately.

Further, no matter how strongly a document is crooked, it reaches the step 58a through the guidance of the press-contact sheet 8 or the document table glass 2, and therefore, it is possible to strike it to the step 58a more accurately, and more accurate document setting becomes possible, and it is possible to exponentially improve operability, (Configuration of Document Struck Portion of Document Table)

Between the document table glass 2 and a rim of an opening portion of the apparatus main body 1 in which the document table glass 2 is incorporated, the steps 58 (58a, 58b, 58c, 58d) are disposed as described above (see, FIG. 10).

Here, the opening portion, in which the document table glass 2 is incorporated, is disposed in the shape of a nearly rectangle in tune with a document, and the steps 58a, 58b, 58c, 58d configure four sides of the rectangle. Among the steps 58, two steps 58a, 58b, which are nearly orthogonal, become a document positioning member for deciding a document reading start position in a main scanning direction and a sub scanning direction, on the occasion of placing a document on the document table glass 2.

The step 58a is located at the lowermost portion in case that the above-described support structure comes into a vertically placed condition, and therefore, it is desirable that it has a height sufficient for receiving a document which falls down due to gravity.

On that account, in this embodiment, the step 58a is set up to a height of nearly 3 mm from a glass surface of the document table glass 2.

On one hand, on the occasion of reading out a large document such as a map, it is desirable that floating of a document due to the step is as small as possible, i.e., it is desirable that the step 58 is as small as possible.

On that account, in this embodiment, the step 58c, which is located at a position facing to the step 58a which becomes the document positioning member in the vicinity of the hinge 7, is set up to a height of nearly 0.5 mm from the document table glass 2. Then, two steps 58b, 58d, which are orthogonal to the above-described two steps 58a, 58c, respectively, are configured in such a manner that a height is changed gradually from a height of nearly 3 mm to a height of nearly 0.5 mm so as to prevent a step from being formed at a rim of the opening portion as shown in FIG. 10.

By this means, it is possible to eliminate an unnecessary step having the possibility that it becomes a cause for exerting a bad influence to a read image and doing damage to a document, as much as possible.

By realizing such step configuration, it is possible to surely receive a document which is set at the time of a vertically placed condition of the image reading apparatus, and it is also possible to improve a reading performance of a large document such as a map.

(Pressure Fastening Sheet Configuration)

Figure 20:
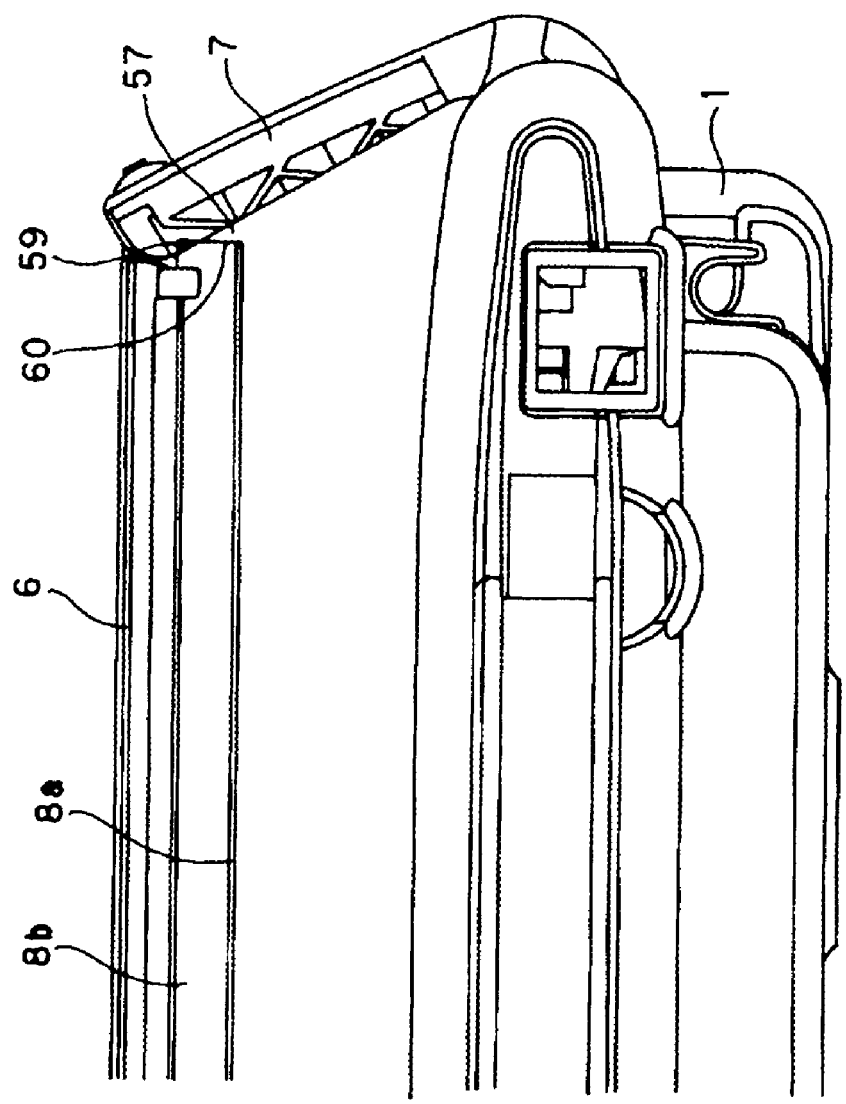
FIG. 20 is a view for explaining a relation of a press-contact sheet and the hinge in the case that only the hinge is opened by 60 degrees.
Figure 21:
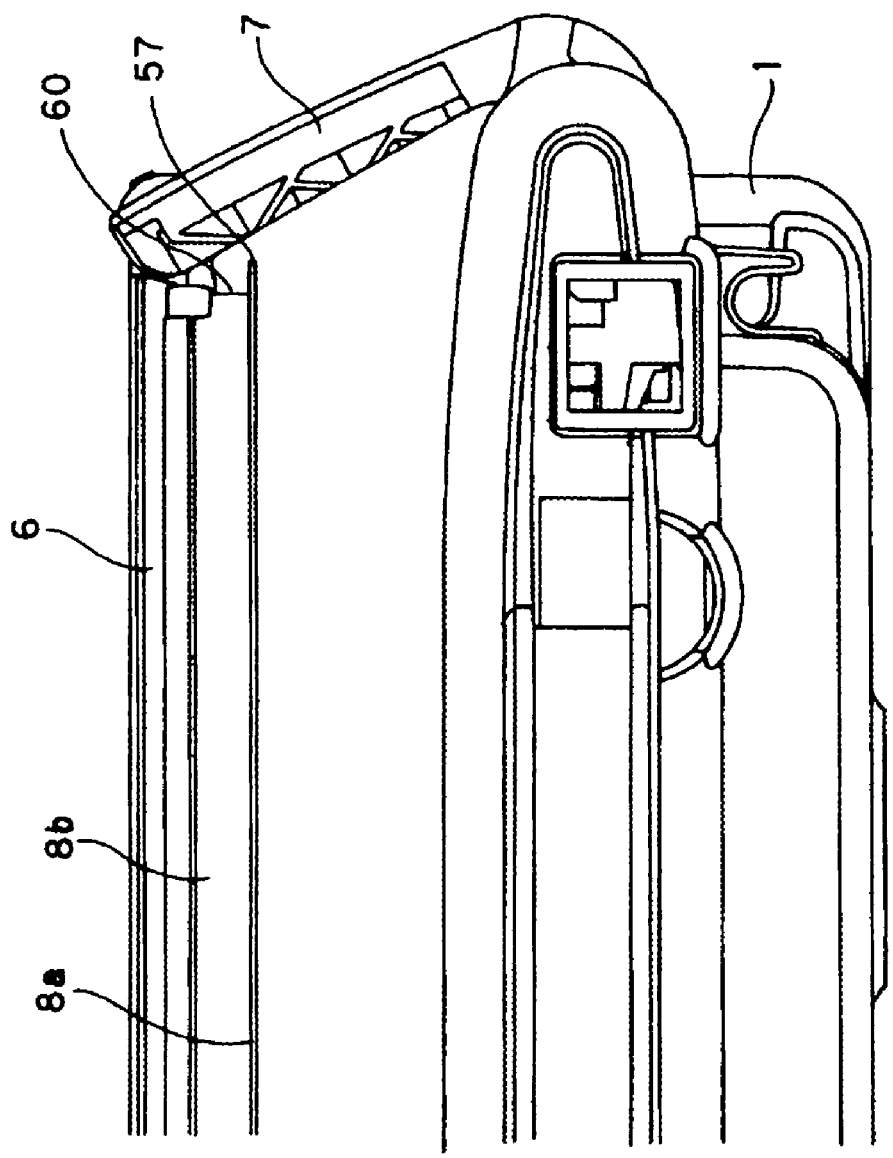
FIG. 21 is a view for explaining a relation of the press-contact sheet and the hinge in the case that only the hinge is opened by 60 degrees in the embodiment of the invention.

FIG. 20 is a view for explaining a relation of the press-contact sheet and the hinge in case that only the hinge is opened by 60 degrees, and FIG. 21 is a view for explaining a relation of the press-contact sheet and the hinge in case that only the hinge is opened by 60 degrees in the embodiment of the invention.

It is desirable that the press-contact sheet 8, which is incorporated in the document cover 6, mainly presses a thin document from an upper side and in case that there are corrugation and curl on the document, it sets them straight, and has the document firmly attached to the document table glass 2, and it prevents extra outside light, which is not irradiation light of a reading apparatus, from entering into a document. On that account, the press-contact sheet 8 is configured so as to be able to cover over a document in the largest possible range. A commonly used press-contact sheet is incorporated in a document cover at a position which is almost the closest to a rim of the opening portion in which the document table glass 2 is incorporated as described above, i.e., with a size slightly smaller than the opening portion.

By realizing such configuration, it becomes the configuration that it is easy to realize a relation of (a distance c between the document table glass 2 of the apparatus main body 1 and the end portion 57 of the lowermost portion of the press-contact sheet 8)<(a step (a height from the document table glass 2) d of the step 58*a*)

at the time of placing a document in the vertically placed condition as described above.

On one hand, when a thick document D such as a book is placed on the document table glass 2 and the document cover 6 is closed, the document cover 6 is bent on the lower side due to its own weight, centering on the axis supporting portions 6*a*, 7*b* between it and the hinge 7, and becomes the posture that the press-contact sheet 8 presses the thick document D, as shown in FIGS. 12, 13.

In this posture, the posture is maintained at the position that an opening angle of the document cover 6 to the apparatus main body 1 is nearly 0°.

In such case, the press-contact sheet 8, which is configured by a sheet member 8*a* and an elastic member 8*b* such as sponge, turns around a fitting portion of the concave portion 1*a* which is disposed at a rear end portion of the apparatus main body 1 and the convex portion 7*a* at a rear end of the hinge as a turning center, as shown in FIG. 20.

Then, it is concerned that the elastic member 8*b* knocks up against the hinge 7 (shaded portion 59) while the hinge 7 turns by a certain angle or more, within a pivot angle range.

This is considered to be because the press-contact sheet 8 is located at a portion which is almost the closest to a rim (step 58*a*) of the opening portion as described above, and further, an end portion 60 of the elastic member 8*b* in the vicinity of the hinge 7 is disposed at almost the same position as the end portion 57 of the sheet member 8*a* in the vicinity of the hinge 7.

In order to avoid this, it is conceivable that, a fitting portion (turning center) of the concave portion 1*a* which is disposed at a rear end portion of the apparatus main body 1 and the concave portion 7*a* at a rear end of the hinge is shifted to the back side of the apparatus, without changing positions of the axis supporting portions 6*a*, 7*b*, and a turning angle of the hinge 7 is reduced, to avoid interference.

Alternately, it is conceivable that the end portion 57 of the sheet member 8*a* is separated from the step 58*a* which becomes the document positioning member.

However, in such method, there occurs bad effects such as size growing of the apparatus (in case of the former), a bad influence to a read image and degradation of a document placing performance at the time of vertically placing (in case of the latter).

Then, in this embodiment, the elastic member 8*b* is shortened rather than the sheet member 8*a* as shown in FIG. 21.

In sum, in a direction which is nearly orthogonal to a turning axis which is configured by the axis supporting portions 6*a*, 7*b*, an end portion of the elastic member 8*b* is disposed at a position which is more distant from the axis supporting portions 6*a*, 7*b* than an end portion of the sheet member 8*a*.

By realizing such configuration, it is possible to prevent the elastic member 8*b* from contacting the hinge 7, without growing the apparatus in size, by having a document D attached firmly to the document table glass 2 with certainty, and without exerting a bad influence to a read image.

In addition, it also becomes possible to surely carry out document installation in a vertically placed condition.

This application claims priority from Japanese Patent Application No. 2004-379258 filed Dec. 28, 2004, which hereby incorporated by reference herein.

What is claimed is:

1. An image reading apparatus having a document table on which a document rests and reads out an image of the document, and an image reading apparatus main body positionable so that a surface of the document table is oriented horizontally or vertically, comprising:

a document cover configured to be openable and closeable relative to the image reading apparatus main body, and having a pressing-contacting member which contacts with and presses a document on the document table;

a positioning section having a step on the document table for positioning the document on the document table; and a restriction member configured to restrict a turning range of the document cover so that a turning angle of the document cover in an open position when the document table is oriented vertically is smaller than the turning angle of the document cover when the document table is oriented horizontally, wherein, when the document cover is at the open position while the document table is oriented vertically, a distance between an end portion of the pressing-contacting member adjacent to the step and the document table is smaller than a height of the step from the document table.

2. The image reading apparatus as set forth in claim 1, further comprising a hinge member, one end of which is pivotally supported to the image reading apparatus main body and the other end of which is pivotally supported to the document cover, wherein the restriction member restricts the turning range of the hinge member relative to the image reading apparatus main body.

3. The image reading apparatus as set forth in claim 2, further comprising a supporting member for supporting the image reading apparatus main body so that the document table is oriented vertically, wherein the restriction member allows the supporting member to restrict the hinge member, while the document table is oriented vertically.

4. The image reading apparatus as set forth in claim 1, further comprising a hinge member that pivotally support the document cover relative to the image reading apparatus main body, wherein the hinge member is positioned at a lower part of the document cover while the document table is oriented vertically so that the document cover swings opens from an upper part thereof.

\* \* \* \* \*